US007302597B2

United States Patent
Webster

(10) Patent No.: US 7,302,597 B2
(45) Date of Patent: Nov. 27, 2007

(54) MICROPROCESSORS WITH IMPROVED EFFICIENCY PROCESSING A VARIANT SIGNED MAGNITUDE FORMAT

(75) Inventor: Paul Webster, Cambridge (GB)

(73) Assignee: AT&T Corp., New York, NY (US)

(*) Notice: Subject to any disclaimer, the term of this patent is extended or adjusted under 35 U.S.C. 154(b) by 511 days.

(21) Appl. No.: 10/478,082

(22) PCT Filed: May 2, 2002

(86) PCT No.: PCT/GB02/02014

§ 371 (c)(1),
(2), (4) Date: Aug. 9, 2004

(87) PCT Pub. No.: WO02/095573

PCT Pub. Date: Nov. 28, 2002

(65) Prior Publication Data

US 2005/0005180 A1    Jan. 6, 2005

(30) Foreign Application Priority Data

May 18, 2001  (GB)  ................. 0112117.7

(51) Int. Cl.
*G06F 1/32* (2006.01)
(52) U.S. Cl. ..................... 713/320; 712/208
(58) Field of Classification Search ............ 713/320; 712/208
See application file for complete search history.

(56) References Cited

U.S. PATENT DOCUMENTS

| 3,824,589 A | 7/1974 | King |
| 5,790,874 A | 8/1998 | Takano et al. |

FOREIGN PATENT DOCUMENTS

| EP | 0 520 650 A | 12/1992 |
| EP | 0 594 969 A | 5/1994 |
| GB | 2 239 113 A | 6/1991 |
| JP | 8 106 384 A | 4/1996 |

OTHER PUBLICATIONS

Benjamin Bishop, Anil Bahuman, "A Low-Energy Adaptive Bus Coding Scheme," IEEE Computer Society Workshop on VLSI 2001, Apr. 19-20, 2001, pp. 118-122.*
Kim Sunghwan et al.: "Low Power Data Representation", Electronics Letters, IEE Stevenage, GB, vol. 36, No. 11, May 25, 2000, pp. 958-969.
Sacha J R et al: "Number Representations for Reducing Data Bus Power Dissipation", Signals, Systems & Computers, 1998. Conference Record of the Thirty Second Asilomar Conference on Pacific Grove, CA, USA Nov. 1-4, 1998, Piscataway, NJ, USA, IEEE, US, Nov. 1, 1998, pp. 213-217.

(Continued)

*Primary Examiner*—Chun Cao
*Assistant Examiner*—Albert Wang

(57) ABSTRACT

A microprocessor is arranged to process instructions at least some of which contain at least one immediate value which forms an operand of the function, wherein said immediate value is represented in a format which achieves a greater power efficiency than two's complement when said instructions are processed.

8 Claims, 6 Drawing Sheets

OTHER PUBLICATIONS

Menghui Zheng et al: "Low Power and High Speed Multiplication Design Through Mixed Number Representations" Computer Design: VLSI in Computers and Processors, 1995. ICCD '95, Proceedings, 1995 IEEE International Conference on Austin TX USA Oct. 2-4, 1995, Los Alamitos, CA USA IEEE Computer Soc. US Oct. 2, 1995, pp. 566-570.

Su C-L et al: "Low Power Architecture Design and Compilation Techniques for High Performance Processors" Intellectual Leverage: Digest of Papers of the Spring Computer Society International Conference (COMPCON) San Francisco Feb. 28-Mar. 4, 1994, Los Alamitos CA IEEE Comp. Feb. 28, 1994, pp. 489-498.

* cited by examiner

MICROPROCESSORS WITH IMPROVED EFFICIENCY PROCESSING A VARIANT SIGNED MAGNITUDE FORMAT

This application claims the benefit of International Patent Application Number PCT/GB02/02014, filed May 2, 2002, which claims priority to Great Britain Patent Application No. 0112117.7, filed May 18, 2001.

The invention relates to microprocessors and processing systems with improved power efficiency.

The concept of Hamming distance will first be described. The Hamming distance between two binary numbers is the count of the number of bits that differ between them.

For example:

| Numbers in decimal | Numbers in binary (inc. leading zeros) | Hamming distance |
| --- | --- | --- |
| 4 and 5 | 0100 and 0101 | 1 |
| 7 and 10 | 0111 and 1010 | 3 |
| 0 and 15 | 0000 and 1111 | 4 |

Hamming distance is related to power efficiency in microprocessors because of the way that binary numbers are represented by electrical signals. Typically a steady low voltage on a wire represents a binary 0 bit and a steady high voltage represents a binary 1 bit. A number will be represented using these voltage levels on a group of wires, with one wire per bit. Such a group of wires is called a bus. Energy is used when the voltage on a wire is changed. The amount of energy depends on the magnitude of the voltage change and the capacitance of the wire. The capacitance depends to a large extent on the physical dimensions of the wire. So when the number represented by a bus changes, the energy consumed depends on the number of bits that have changed—the Hamming distance—between the old and new values, and on the capacitance of the wires.

If one can reduce the average Hamming distance between successive values on a high-capacitance bus, keeping all other aspects of the system the same, the system's power efficiency will have been increased.

The capacitance of wires internal to an integrated circuit is small compared to the capacitance of wires fabricated on a printed circuit board due to the larger physical dimensions of the latter. Systems commonly have memory and microprocessor in distinct integrated circuits, interconnected by a printed circuit board. Therefore, one object of the present invention is to reduce the average Hamming distance between successive values on the microprocessor-memory interface signals, as this will have a particularly significant influence on power efficiency.

Even in systems where microprocessor and memory are incorporated into the same integrated circuit the capacitance of the wires connecting them will be larger than average, so even in this case reduction of average Hamming distance on the microprocessor-memory interface is worthwhile.

U.S. Pat. No. 5,790,874 describes reducing Hamming distances between instructions using several different techniques. In the technique involving immediate values, U.S. Pat. No. 5,790,874 discloses replacing the subtraction of a positive 2's complement value with the addition of a negative 2's complement value, and vice-versa, if such replacement reduces the Hamming distance between adjacent values.

The publication "Low Power Architecture Design and Compilation Techniques for High-Performance Processors," by Su et al, XP000479424 ISBN 0-8186-5380-9 pages 489 to 498 teaches the use of Gray code in representations of instruction addresses passing between modules in the architecture of high-speed microprocessors.

According to the invention there is provided a microprocessor and processing system as claimed in the accompanying claims.

Embodiments of the invention will now be described, by way of example only, with reference to the accompanying drawings, in which.

Figure 1:
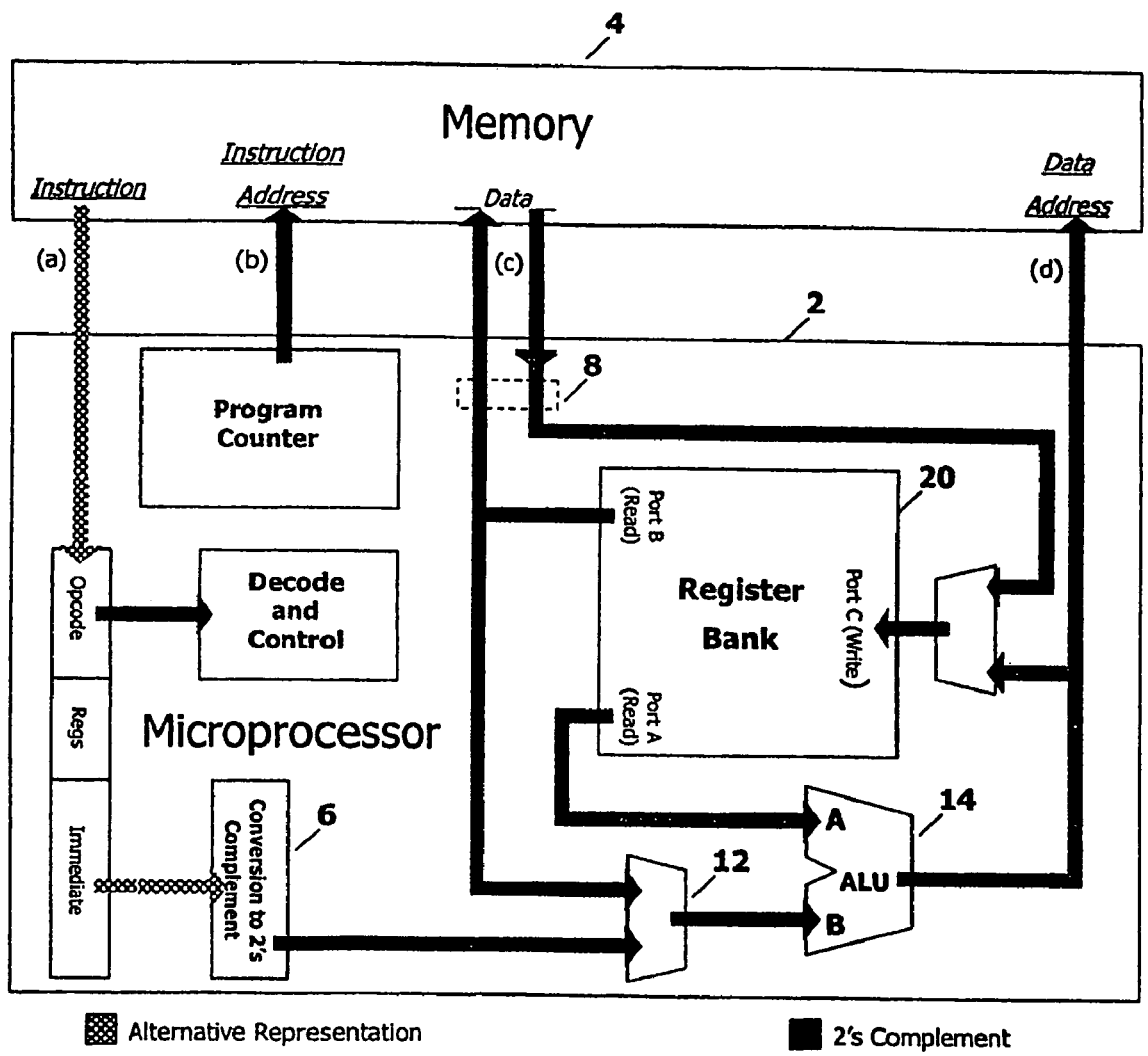
FIG. 1 illustrates the arrangement of a microprocessor 2 and its memory 4, showing the interconnections between them.

FIG. 1 illustrates the arrangement of a microprocessor 2 and its memory 4, showing the interconnections between them. The processor-to-memory communications perform two tasks. Firstly, the processor 2 fetches its program from the memory 4, one instruction at a time. Secondly, the data that the program is operating on is transferred back and forth. As an example, this embodiment focuses mainly on the instruction fetch, which makes up the majority of the processor-memory communications.

The instruction fetch bus (a) is the bus on which instructions are communicated from the memory 4 to the processor 2. This embodiment reduces the average Hamming distance on this bus, by reducing the average Hamming distance from one instruction to the next.

The power-saving technique employed in this embodiment reduces the average inter-instruction Hamming distance for a part of the instruction called the immediate value. The format of instructions and the role of immediate values in this embodiment will first be described.

The processor 2 falls into the category of RISC (Reduced Instruction Set Computer) processors. One defining characteristic of this category of processors is that they have regular, fixed-size instructions. In the processor 2 all instructions are made up of 32 bits.

This is the same as the size of the instruction fetch bus (a) (see FIG. 1). The technique for Hamming distance reduction described here is particularly effective in this case but can be applied to all types of microprocessor.

Each instruction conveys various items of information to the processor. These items include, referring to FIG. 2:

(1) Operation codes (opcodes) indicating which basic action, such as addition, subtraction, etc. the processor
(2) should carry out.

(2) Register specifiers, indicating which of the processor's internal storage locations (registers) should supply operands to or receive results from the operation.

(3) Values that are used directly as operands to the function called immediate values.

For example, an instruction that tells the processor 2 to "add 10 to the value currently in register 4 and store the result in register 5" would have the opcode for 'add', register specifiers 4 and 5, and immediate value 10.

Figure 2:
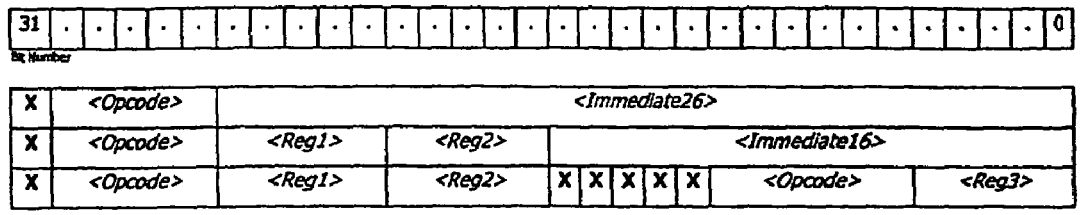
FIG. 2 shows instruction formats for a typical microprocessor.

The instruction set of the processor 2 has only three instruction formats, shown in FIG. 2. The first has a five-bit opcode and a 26-bit immediate value. The second has a five-bit opcode, two five-bit register specifiers, and a 16-bit immediate value. The third has a five-bit opcode, three five-bit register specifiers and a six-bit opcode. (These bit-counts don't add up to 32 bits because the processor 2 ignores some of the bits in certain formats.)

As a consequence of this choice of instruction formats, very often the low-numbered bits in one instruction will contain an immediate value and so will the same bits in the next instruction. This embodiment aims to reduce the average inter-instruction Hamming distance in this case by choosing unconventional number representations for the immediate values.

There are implications to changing the processor's number representation. Existing programs written in high-level languages make assumptions about the number representations used by the processors on which they run. For example, code might expect to be able to determine the sign of a number by inspecting its most significant bit, or whether it is odd or even by inspecting its least significant bit (these are both properties of the usual "two's complement" number representation). If we use an alternative number representation throughout the processor 2, such code will fail to function.

To maintain the expected behavior of such code, in this embodiment only immediate values in instructions will use an alternative representation. A conversion circuit must convert the alternative representation to two's complement before it interacts with other data. Refer to FIG. 1 for an illustration of the placement of the conversion circuit 6 within the microprocessor 2.

In applications where maintaining the expected behaviour of code that relies on the use of a particular number representation is not important, the invention can be applied to the data bus (c) as well. External peripheral devices would also need to use the alternative number representation. Since data is transferred in both directions between the processor and the memory the conversion would need to be applied in both directions. This conversion circuit is labelled (8).

To appreciate the likely average Hamming distances for the different number representations it is necessary to understand the typical distribution of immediate values.

Empirical studies show that immediate values can be both positive and negative but are more often small then large. This is because:

(a) Repetitive sequences of operations are often governed by counters which are incremented or decremented by one, or another small amount, on each iteration. These small values appear as immediate values in the instructions.

(b) Immediate values often indicate memory address displacements, for example the distance from one piece of program to another. The most frequently used displacements tend to be small as related code and data is normally located in nearby areas of memory. References to less closely related code and data, with larger displacements, tend to be less common.

The conventional method of representing numbers that may be positive or negative in binary is called two's complement. The main benefit of two's complement is that the hardware needed to implement arithmetic operations, such as addition, is simple. The following table shows the representations for small positive and negative numbers using a 16-bit two's complement encoding:

| Number in decimal | Number in two's complement binary |
|---|---|
| 5 | 0000000000000101 |
| 4 | 0000000000000100 |
| 3 | 0000000000000011 |
| 2 | 0000000000000010 |
| 1 | 0000000000000001 |
| 0 | 0000000000000000 |
| −1 | 1111111111111111 |
| −2 | 1111111111111110 |
| −3 | 1111111111111101 |
| −4 | 1111111111111100 |
| −5 | 1111111111111011 |

Considering our objective of low inter-instruction Hamming distance and the typical distribution of immediate values it is apparent that two's complement is not an ideal representation. The Hamming distance from one small value to another is small as long as the values both have the same sign: for example, the Hamming distance from 2 to 3 is 1. On the other hand, if the values have differing signs the Hamming distance will be large as all of the top bits of the representation change: the Hamming distance from 2 to −2 is 14.

A well-known alternative representation is called sign-magnitude. It uses one bit to indicate the sign of the number and the others to represent the absolute value in conventional binary:

| Number in decimal | Number in sign-magnitude binary |
|---|---|
| 5 | 0000000000000101 |
| 4 | 0000000000000100 |
| 3 | 0000000000000011 |
| 2 | 0000000000000010 |
| 1 | 0000000000000001 |
| 0 | 0000000000000000 |
| −0 | 1000000000000000 |
| −1 | 1000000000000001 |
| −2 | 1000000000000010 |
| −3 | 1000000000000011 |
| −4 | 1000000000000100 |
| −5 | 1000000000000101 |

This representation clearly has a smaller typical Hamming distance than two's complement for small positive and negative values since the higher-numbered magnitude bits are almost always '0'. For example the Hamming distance from 2 to −2 is reduced from 14 for two's complement to just 1.

A disadvantage of sign-magnitude is that hardware to perform arithmetic on sign-magnitude numbers is more complex than for two's complement there are two possible representations for zero, and consequently one fewer distinct values that can be represented. Special circuitry is inevitably needed take account of this.

Conversion to two's complement is as follows: if the sign bit is clear, do nothing; if the sign bit is set, invert and add 1 to the magnitude bits. The circuit to implement this conversion, shown in FIG. 3, requires a sub-circuit to add 1; such a circuit adds a significant delay to the conversion.

Figure 3:
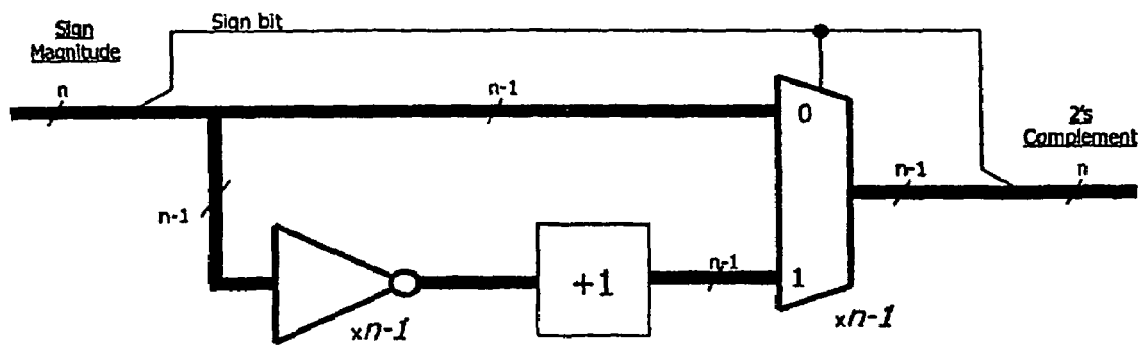
FIG. 3 shows a circuit for converting from sign-magnitude format to 2's complement format.

It should be noted that in FIG. 3, and the figures that follow, a thin line shows single signals and buses are shown by a thicker line annotated with the number of bits in the bus. Gates shown in bold and annotated with a multiplier (×n) represent n gates, one for each bit of the connected buses. Single signals shown connected to these multiple gates indicate that the signal goes to every one of the gates.

A Gray code is a number representation in which the Hamming distance between values that differ by one is one. There are many such representations, but the following is the most commonly used:

| Number in decimal | Number in Gray code |
|---|---|
| 5 | 0000000000000111 |
| 4 | 0000000000000110 |
| 3 | 0000000000000010 |
| 2 | 0000000000000011 |
| 1 | 0000000000000001 |
| 0 | 0000000000000000 |
| −1 | 1000000000000000 |
| −2 | 1000000000000001 |
| −3 | 1000000000000011 |
| −4 | 1000000000000010 |
| −5 | 1000000000000110 |

Like sign-magnitude, Gray code has a smaller average Hamming distance than two's complement because the high-numbered bits don't all change when the sign changes. Unlike sign-magnitude, there is only a single representation of zero.

Figure 4:
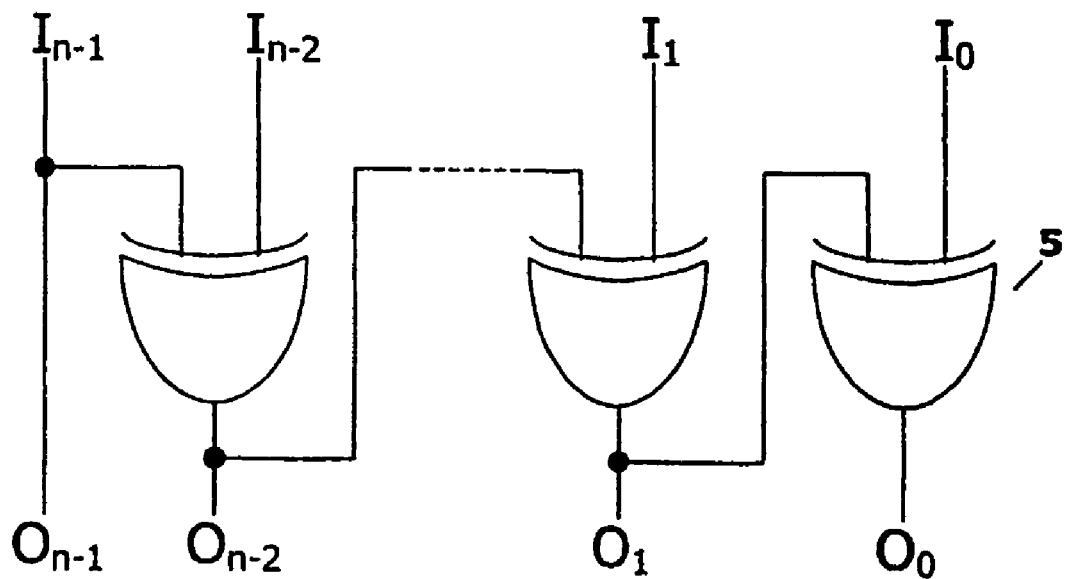
FIG. 4 shows a circuit for converting from Gray code to 2's complement format.

Conversion of values represented using this Gray code to two's complement is accomplished using the circuit shown in FIG. 4. This circuit uses n−1 exclusive-or gates 5 to convert an n-bit value. Note that the least significant output bit, $O_0$, is not valid until n−1 gate delays after the input arrives.

The invention includes embodiments in which the format used for immediate values is chosen to improve the power efficiency of the processor. This includes the use of sign magnitude and Gray code representations for the immediate values.

This embodiment makes use of a variant of the sign-magnitude format that has the low average Hamming distance of standard sign-magnitude but with a lower conversion circuit complexity.

In the variant, as in sign-magnitude, the most significant bit represents the sign: '0' for positive numbers and zero, and '1' for negative numbers. The remaining bits encode the magnitude of the number if it is positive, or one less than the magnitude of the number if it is negative:

| Number in decimal | Number in variant sign-magnitude binary |
|---|---|
| 5 | 0000000000000101 |
| 4 | 0000000000000100 |
| 3 | 0000000000000011 |
| 2 | 0000000000000010 |
| 1 | 0000000000000001 |
| 0 | 0000000000000000 |
| −1 | 1000000000000000 |
| −2 | 1000000000000001 |
| −3 | 1000000000000010 |
| −4 | 1000000000000011 |
| −5 | 1000000000000100 |

Note that unlike standard sign-magnitude there is a single representation of zero.

Figure 5:
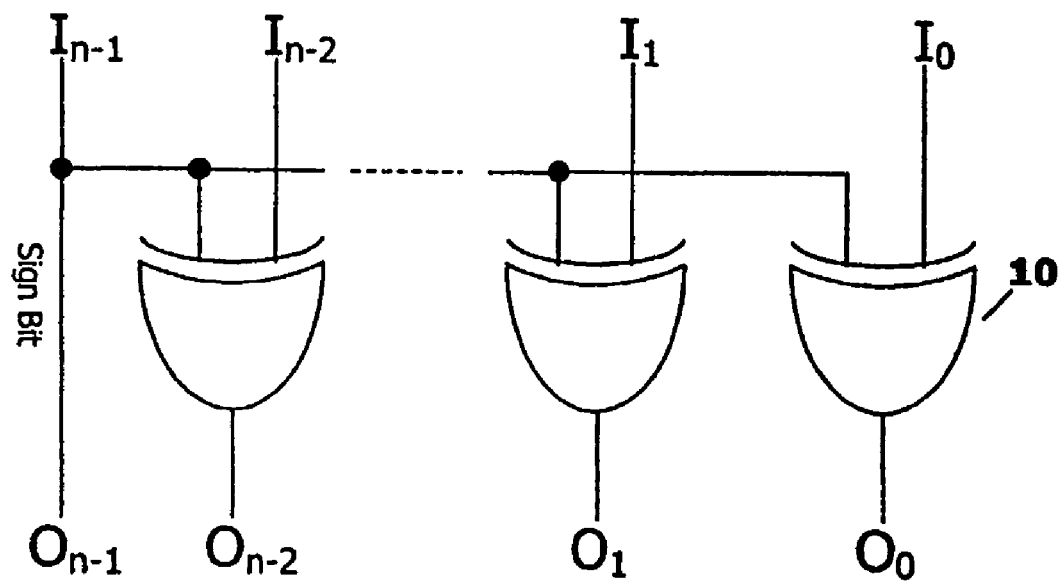
FIG. 5 shows a circuit for converting from a sign-magnitude variant format to 2's complement format.

Conversion to two's complement can be accomplished as follows: if the sign bit is zero, nothing is changed; if the sign bit is one, the magnitude bits are inverted. A circuit to implement this conversion is shown in FIG. 5, in which the input and output bits are represented by I and O respectively. The circuit makes use of n−1 exclusive-or gates.

The same circuit can be used for the reverse conversion from two's complement to variant sign-magnitude. If the alternative number representation is applied to the data bus (c) of FIG. 1 two instances of the circuit of FIG. 5 can be used to perform the necessary conversions.

Referring back to FIG. 1, we note that the output of the conversion circuit 6 that converts from the new representation to two's complement is connected via a multiplexor 12 to the input to the ALU 14. In this embodiment the conversion circuit and multiplexor are merged together to provide a more efficient implementation. Such a merged implementation for the sign magnitude variant representation will now be described.

Figure 6:
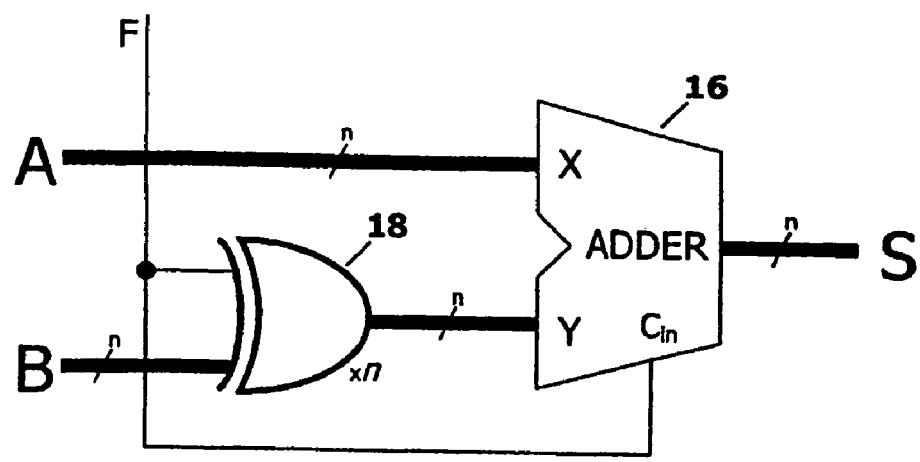
FIG. 6 shows a circuit for an ALU which can perform both addition and subtraction.

Consider an ALU 14 that performs one of two functions: it either adds or subtracts its operands A and B to produce a sum or difference, S, determined by a control signal F which is '0' for addition and '1' for subtraction. A well-known implementation for such an ALU 14 is shown in FIG. 6. It operates on two's complement data by combining an adder 16 with n exclusive-or gates 18 that invert input B when subtraction is selected. F is also supplied as the carry-in to the least significant bit of the adder (note that, to negate a two's complement value, the bits are inverted and one is added).

Practical microprocessors will typically perform other operations besides addition and subtraction, but this approach remains valid.

As FIG. 1 shows, input B to the ALU 14 comes from either the output of the conversion circuit 6 or from the register bank 20 (which stores values in two's complement). Selection of one or other source for the value is determined by the particular instruction being executed. An output from the instruction decoder, M, controls multiplexor 12 that selects one or the other; '0' selects the register bank and '1' selects the output from the conversion circuit 6

Figure 7:
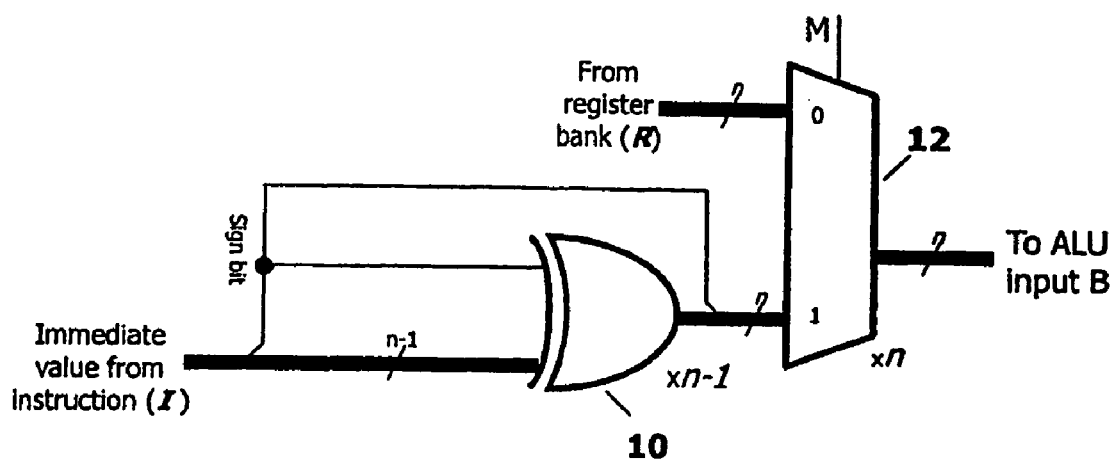
FIG. 7 shows the conversion circuit of FIG. 5 in combination with the multiplexor of FIG. 1 which determines the input B to the ALU.

FIG. 7 shows the conversion circuit 6 (as shown in FIG. 5) along with the multiplexor 12.

Figure 8:
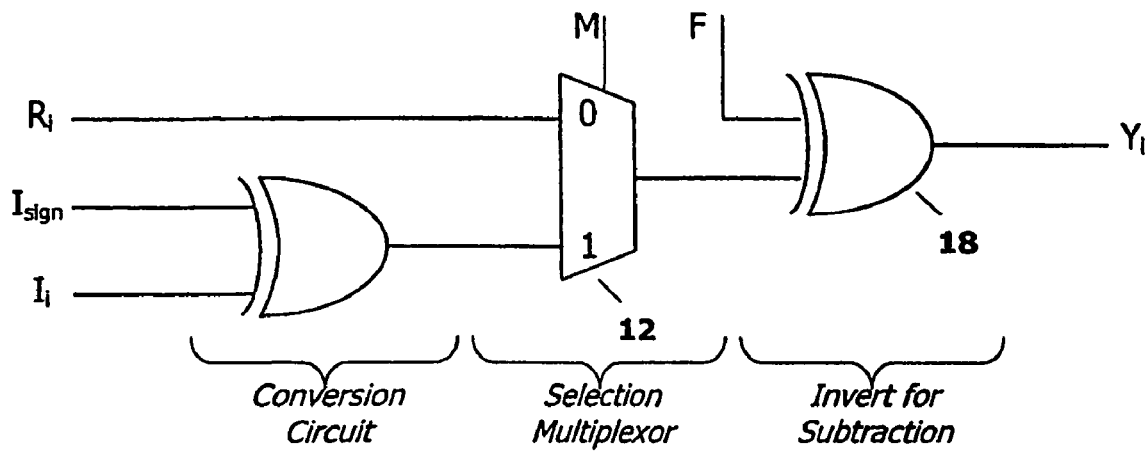
FIG. 8 shows the combination of components from FIGS. 6 and 7, giving the path to each bit of the Y input of the ADDER.

Considering FIGS. 6 and 7, it can be seen that the path taken to each bit (other than the sign bit) of the Y input of adder 16 is as shown in FIG. 8.

Figure 9:
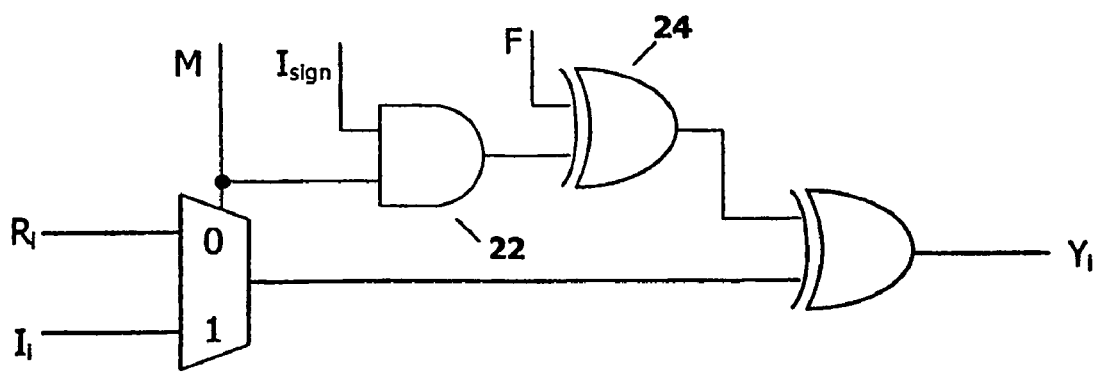
FIG. 9 shows a logically equivalent management of the circuit of FIG. 8.

This circuit of FIG. 8 can be re-arranged to the circuit of FIG. 9, which is logically equivalent. The advantage of this latter circuit is that a single instance of the AND gate 22 and the exclusive-or gate 24 can be shared by all bits.

Figure 10:
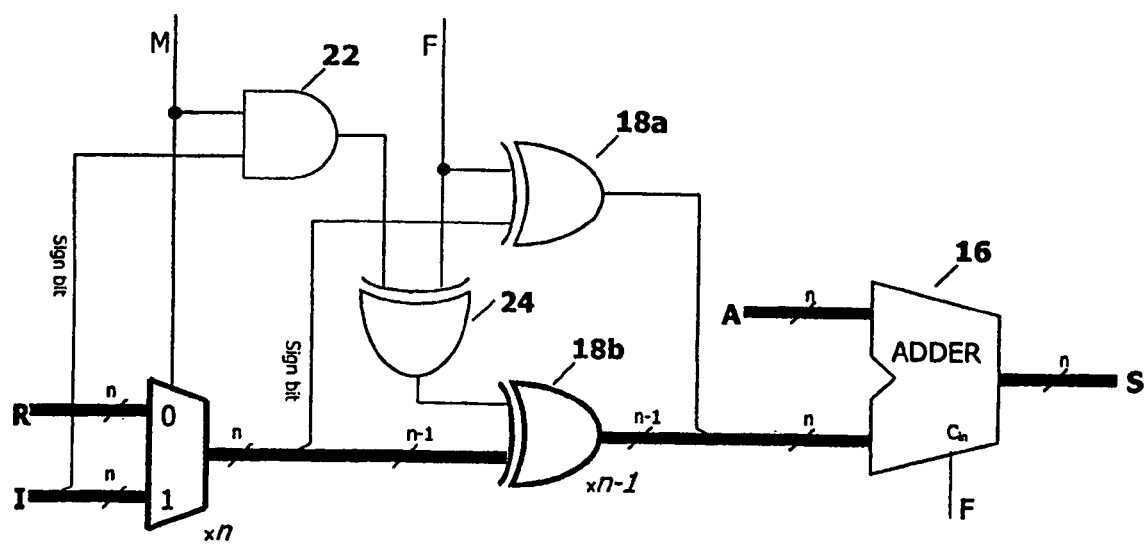
FIG. 10 shows the complete design for the combined version circuit and ALU.

FIG. 10 shows the complete design for the combined conversion circuit and ALU. The conversion circuit of FIG. 5 requires n−1 exclusive-or gates 10, and this overhead is reduced in FIG. 10 to a single exclusive-or gate 24, and a single AND gate 22.

The following table compares features of the various number representations discussed above.

| Representation | Efficiency | Conversion circuit size | Conversion circuit delay | Hamming distance for typical values |
|---|---|---|---|---|
| Two's complement | $2^n$ unique values | None required | None required | Large when sign changes |
| Sign magnitude | $2^n - 1$ unique values | Large | Slow | Small |
| Gray code | $2^n$ unique values | n − 1 XOR gates | n − 1 gate delays | Small |
| Sign magnitude variant | $2^n$ unique values | n − 1 XOR gates or 1 XOR and 1 AND gate when merged with the ALU | One gate delay | Small |

From the results presented above we can see that the new sign-magnitude variant offers a good combination of features. Its conversion circuit is relatively simple and fast, especially when merged with an ALU, and it offers a significant saving compared to two's complement in the average Hamming distance metric.

A microprocessor incorporating this feature can expect significantly improved power efficiency.

It should be appreciated that variations of the embodiments described above are possible within the scope of the invention. For example, minor modifications to the sign-magnitude variant format are possible, including for example simply inverting or permuting some or all of the bits.

The invention claimed is:

1. A microprocessor arranged to process instructions at least some of which contain at least one immediate value which forms an operand of the function, said immediate value being represented in a format which achieves a greater power efficiency than two's complement when said instructions are processed;
   wherein said format is a variant sign magnitude format in which:
   (a) non-negative values (including zero) are represented by a sign bit of 0 and a binary representation of the value
   (b) negative values are represented by a sign bit of 1 and a binary representation of one less than the magnitude of the value;
   which microprocessor further comprises at least one arithmetic and logic unit (ALU) having an input arranged to receive either one of said immediate values or an alternative value from elsewhere.

2. A microprocessor as claimed in claim 1, which further comprises a multiplexor having a first input adapted to receive said one of said immediate values and a second input adapted to receive said alternative value.

3. A microprocessor as claimed in claim 2, wherein said ALU is arranged to perform at least addition and subtraction, and wherein a conversion circuit, for converting values from said variant sign-magnitude format to two's complement, is merged with said ALU in such a way that the merged circuit operates with an overhead of one AND gate and one exclusive-or gate.

4. A microprocessor as claimed in claim 3, wherein said multiplexor is connected to said ALU by a circuit substantially the same as that shown in FIG. 10.

5. A microprocessor as claimed in claim 1 wherein some or all bits of said immediate values are inverted or permuted.

6. A processing system comprising a microprocessor, a memory, and a data bus connecting, and arranged to pass data between, the microprocessor and the memory, said data being represented in a variant sign-magnitude format in which:
   (a) non-negative values (including zero) are represented by a sign bit of 0 and a binary representation of the value
   (b) negative values are represented by a sign bit of 1 and a binary representation of one less than the magnitude of the value;
   wherein said microprocessor processes said data in two's complement format, and wherein a conversion circuit is provided for converting said data from said variant sign-magnitude format to two's complement, and vice-versa.

7. A processing system as claimed in claim 6, wherein some or all bits in said data are inverted or permuted.

8. A processing system as claimed in claim 6, wherein said microprocessor is arranged to process instructions at least some of which contain at least one immediate value which forms an operand of the function, said immediate value being represented in a format which achieves a greater power efficiency than two's complement when said instructions are processed.

* * * * *

UNITED STATES PATENT AND TRADEMARK OFFICE
CERTIFICATE OF CORRECTION

PATENT NO. : 7,302,597 B2  Page 1 of 1
APPLICATION NO. : 10/478082
DATED : November 27, 2007
INVENTOR(S) : Paul Webster et al.

It is certified that error appears in the above-identified patent and that said Letters Patent is hereby corrected as shown below:

Title Page item 75
Under the Inventor heading: insert after "Paul Webster, Cambridge (GB)" --Phil Endecott, Cambridge (GB)--.

Signed and Sealed this

Twenty-first Day of December, 2010

David J. Kappos
*Director of the United States Patent and Trademark Office*